US012574836B2

(12) United States Patent
    V

(10) Patent No.: US 12,574,836 B2
(45) Date of Patent: Mar. 10, 2026

(54) STEERING WI-FI 6E WIRELESS CLIENTS TO WI-FI 6E ACCESS POINTS ON HYBRID WIRELESS NETWORKS

(71) Applicant: Fortinet, Inc., Sunnyvale, CA (US)

(72) Inventor: Vijayakumar V, Ulsoor (IN)

(73) Assignee: Fortinet, Inc., Sunnyvale, CA (US)

( * ) Notice: Subject to any disclaimer, the term of this patent is extended or adjusted under 35 U.S.C. 154(b) by 440 days.

(21) Appl. No.: 17/854,826

(22) Filed: Jun. 30, 2022

(65) Prior Publication Data

US 2024/0007942 A1    Jan. 4, 2024

(51) Int. Cl.
    *H04W 48/20*        (2009.01)
    *H04W 48/16*        (2009.01)
(52) U.S. Cl.
    CPC .......... *H04W 48/20* (2013.01); *H04W 48/16* (2013.01)
(58) Field of Classification Search
    CPC .............................. H04W 48/20; H04W 48/16
    See application file for complete search history.

(56) References Cited

U.S. PATENT DOCUMENTS

2017/0374602 A1* 12/2017 Gokturk ................ H04L 45/125
2020/0248486 A1*  8/2020 Okuyama ............... E05B 79/08
2020/0367020 A1* 11/2020 Ansley .................. H04W 16/14
2021/0282063 A1*  9/2021 Khoury .................. H04W 8/22
2021/0336752 A1* 10/2021 Kwon ................... H04L 5/0055
2022/0030665 A1*  1/2022 Nakanishi ............... H04W 8/26
2022/0046473 A1*  2/2022 Strater ............. H04W 28/0278
2022/0330136 A1* 10/2022 Siraj ..................... H04W 48/12
2023/0209546 A1*  6/2023 Gauvreau ............. H04W 60/00
                                                          370/328
2023/0262535 A1*  8/2023 Laine ................ H04W 36/0027
                                                          370/331

* cited by examiner

*Primary Examiner* — Rasheed Gidado
(74) *Attorney, Agent, or Firm* — Law Office of Dorian Cartwright; Dorian Cartwright

(57)                    ABSTRACT

A probe request sent from a Wi-Fi 6E wireless client to the legacy access point is received by a Wi-Fi controller. To process, a Wi-Fi 6E access point for connection from the plurality of access points, proximate to the Wi-Fi 6E wireless client is selected for service. Reduced Neighbor Report (RNR) RNR information is collected about the Wi-Fi 6E access point by the access point the Wi-Fi 6E wireless client. The RNR information is transmitted to the legacy access point, wherein the legacy access point forwards the RNR information to the Wi-Fi 6E wireless client as part of a probe response sent responsive to the probe request. A subsequent probe request is detected, sent from the Wi-Fi 6E wireless client to initiate association with the Wi-Fi 6E access point using the RNR information.

5 Claims, 6 Drawing Sheets

<u>100</u>

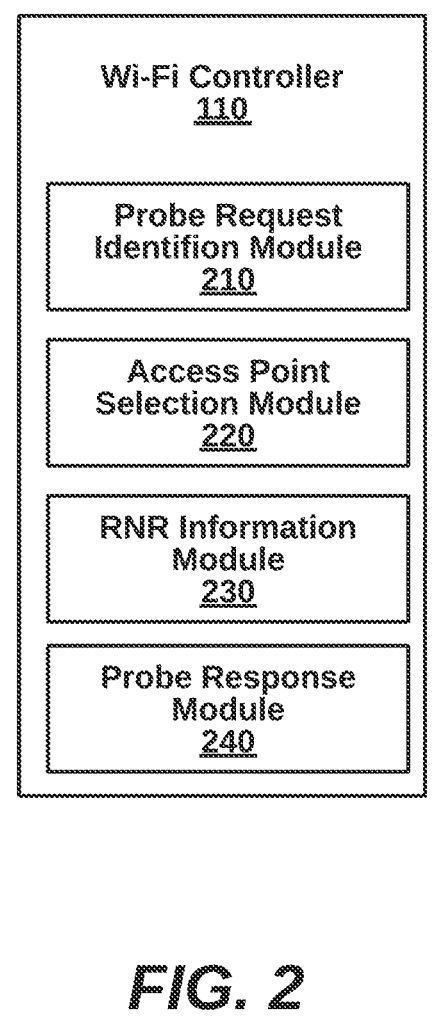

Wi-Fi Controller
110

Probe Request
Identifion Module
210

Access Point
Selection Module
220

RNR Information
Module
230

Probe Response
Module
240

*FIG. 2*

| Element ID | Length | Neighbor AP Information Fields |
|:---:|:---:|:---:|
| 310 | 320 | 330 |

Octets:        1          1          variable

300

| TBTT Information Field Type | Filtered Neighbor AP | Reserved | TBTT Information Count | TBTT Information Length |
|:---:|:---:|:---:|:---:|:---:|
| 331 | 332 | 333 | 334 | 335 |

B0        B1        B2        B3        B4        B7        B8        B15

Bits:        2          1          1          4          6

330

600

STEERING WI-FI 6E WIRELESS CLIENTS TO WI-FI 6E ACCESS POINTS ON HYBRID WIRELESS NETWORKS

FIELD OF THE INVENTION

The invention relates generally to computer networking, and more specifically, to steering Wi-Fi 6E wireless clients to Wi-Fi 6E access points on hybrid wireless networks.

BACKGROUND

Wireless computing technologies provide untethered access to the Internet and other networks. One of the most critical technologies for wireless networking (or Wi-Fi) is the Institute of Electrical and Electronics Engineers (IEEE) 802.11 family of protocols promulgated by the IEEE. Currently, the protocols are widely adopted in wireless devices such as laptop computers, tablet computers, smart phones, and network access applications. Many networks with wireless devices use an access point (access point) with a radio and antenna as an interface between wireless devices and the backbone network which is typically wired. Wireless devices can discover available access points within range of their radios by listening for beacons broadcast by access points which include an identifier such as an SSID. Wireless devices use the identifier in a probe request to initiate a connection to the identified access point.

One problem with stations independently choosing access points is a lack of information about network architecture and capabilities. As a result, a station having Wi-Fi 6E capability may sense and connect with an access point that does not have the same capability even though access points with the same capability are available. In this situation, a lowest common denominator of service is provided, below the Wi-Fi 6E capabilities. Thus, in a hybrid network with both legacy and non-legacy access points, mismatches in capabilities can denigrate network performance.

What is needed is a robust technique for steering Wi-Fi 6E wireless clients to Wi-Fi 6E access points on hybrid wireless networks.

SUMMARY

To meet the above-described needs, methods, computer program products, and systems for steering Wi-Fi 6E wireless clients to Wi-Fi 6E access points on hybrid wireless networks.

In one embodiment, a probe request sent from a Wi-Fi 6E wireless client to the legacy access point is received by a Wi-Fi controller. To process the probe request, a Wi-Fi 6E access point is selected for connection from the plurality of access points. Selection can be based, for example, on proximity to the Wi-Fi 6E wireless client, SSID strength, network congestion and other network statistics, as non-limiting examples.

In another embodiment, Reduced Neighbor Report (RNR) information is collected about the Wi-Fi 6E access point by the Wi-Fi controller. The Wi-Fi 6E access points have the potential for providing better service than the legacy access point. The RNR information is thus transmitted to the legacy access point, wherein the legacy access point forwards the RNR information to the Wi-Fi 6E wireless client as part of a probe response sent responsive to the probe request.

In still another embodiment, a subsequent probe request is detected, sent from the Wi-Fi 6E wireless client to initiate association with the Wi-Fi 6E access point using the RNR information. This provides compatibility for better network services.

Advantageously, network performance is improved with high capability wireless clients being matched with high capability access points. In turn, network devices will operate better with better network performance.

BRIEF DESCRIPTION OF THE DRAWINGS

In the following drawings, like reference numbers are used to refer to like elements. Although the following figures depict various examples of the invention, the invention is not limited to the examples depicted in the figures.

FIG. 2 is a more detailed block diagram illustrating a Wi-Fi controller of the system of FIG. 1, according to one embodiment.

DETAILED DESCRIPTION

Methods, computer program products, and systems for steering Wi-Fi 6E wireless clients to Wi-Fi 6E access points on hybrid wireless networks. One of ordinary skill in the art will recognize many alternative embodiments that are not explicitly listed based on the following disclosure.

Figure 3:
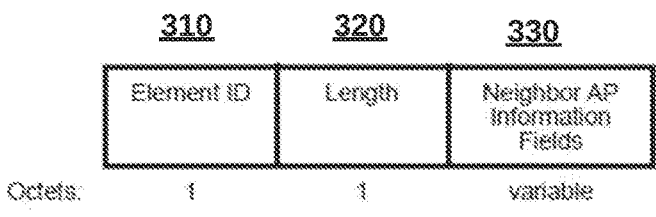
FIG. 3 is a block diagram illustrating the RNR information format, according to one embodiment.

I. Systems for Steering Wi-Fi 6E Wireless Clients (FIGS. 1-3)

Figure 1:
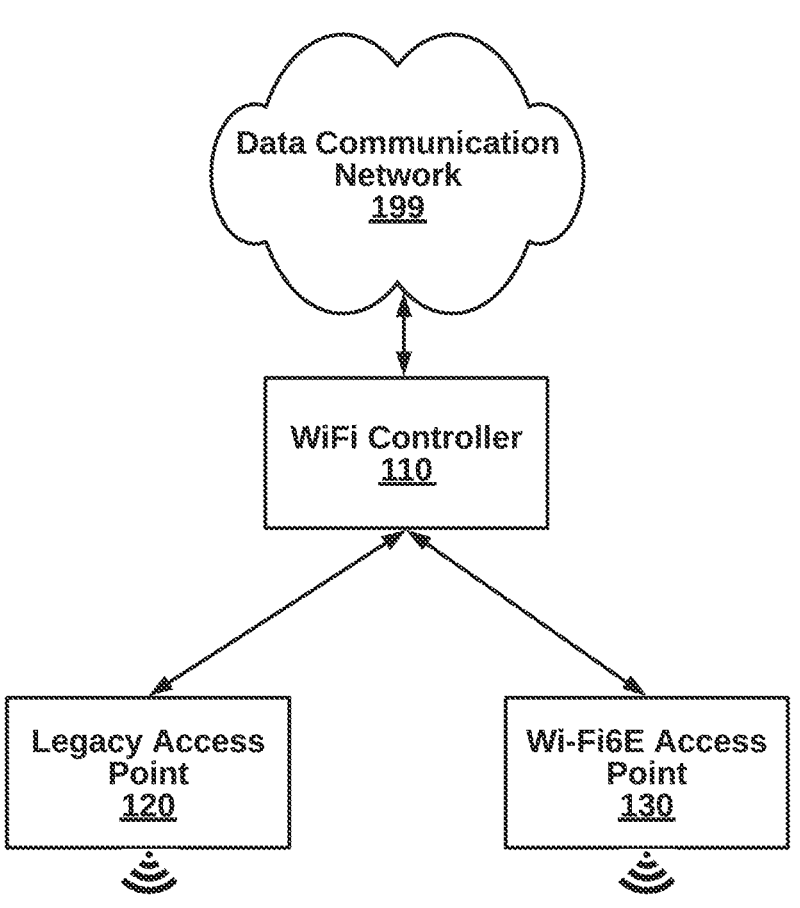
FIG. 1 is a high-level block diagram illustrating a system for steering Wi-Fi 6E wireless clients to Wi-Fi 6E access points on hybrid wireless networks, according to one embodiment.
Figure 1:

FIG. 1 is a high-level block diagram illustrating a system for steering Wi-Fi 6E wireless clients to Wi-Fi 6E access points on hybrid wireless networks, according to one embodiment. The system 100 includes a Wi-Fi controller 110, a legacy access point 120, a Wi-Fi 6E access point 130 and a Wi-Fi 6E wireless client 140, coupled in communication with a data communication network 199. Other embodiments of the system 100 can include additional network components that are not shown in FIG. 1. For example, there can be more access points (authorized and unauthorized) and more stations. There can also be network devices such as switches, routers, fire walls, proxy servers, and the like.

The components of the system 100 are coupled in communication over the data communication network. The components can be connected to the data communication system via hard wire (e.g., the Wi-Fi controller 110, the legacy access point 120 and the Wi-Fi 6E access point 130). The components can also be connected via wireless networking (e.g., the Wi-Fi 6E wireless client 130). The data communication network 199 can be composed of any data communication network such as an SDWAN, an SDN (Software Defined Network), WAN, a LAN, WLAN, a cellular network (e.g., 3G, 4G, 5G or 6G), or a hybrid of different types of networks. Various data protocols can dictate format for the data packets. For example, Wi-Fi data packets can be formatted according to IEEE 802.11, IEEE 802,11r, and the like. Components can use IPv4 or IPv6 address spaces.

The Wi-Fi controller 110 coordinates probe responses to probe requests sent to legacy devices by Wi-Fi 6E wireless clients. Rather than allowing a standard legacy response, a probe response is generated with RNR information about the Wi-Fi 6E network for use by the Wi-Fi 6E wireless client 140 in connecting with a non-legacy access point for better service. As a result, connection stations are given visibility to better connection options. Additional embodiments of the access point 120 are set forth below in FIG. 2.

The legacy access point 120, without Wi-Fi 6E capabilities (e.g., with 2.4 GHz and 5 GHz capabilities), receives a probe request from the Wi-Fi 6E wireless client 140. The probe request itself can identify client capabilities and be detected by the legacy access point 120 as a probe request for forwarding to the Wi-Fi controller 110. In some cases, probe responses to legacy wireless clients are handled locally without forwarding to the Wi-Fi controller 110. A probe response received from the Wi-Fi controller 120, enhanced with RNR information, is then transmitted back to the Wi-Fi 6E wireless client 140.

The Wi-Fi 6E access point 130, with Wi-Fi 6E capabilities (e.g., 2.4 GHz, 5 GHz and 6 GHz capabilities) responds to probe requests with probe responses that natively include RNR information. In more detail, probe requests received over 2.4 GHz or 5 GHz channels can be responded to with information about out-of-band 6 GHz channels. When the legacy access point 120 receives the probe response, the Wi-Fi controller 110 pulls the RNR information from the Wi-Fi 6E access point 130 for reporting back through the legacy access point 120. In one case, a probe request is received from the Wi-Fi controller 110 posing as a wireless client in order to collect RNR information. In another case, RNR information is pulled from the operating system.

There are three states to describe the relationship between access points, with wireless stations: 1) unauthenticated and unassociated; 2) authenticated and unassociated; and 3) authenticated and associated. An additional level of IEEE 802.1x authentication is available. Initially both access points and mobile stations are in state 1. After selecting access points for network access, and successful completion of a challenge-response sequence (e.g., WEP shared key authentication), the components move to state 2. Finally, mobile stations associate with access points to move to state 3. Upon receiving a disassociation request, the components return to state 2, or upon receiving a de-authentication request, the components return to state 1 from either state 2 or 3. Messages cannot be exchanged in either states 1 or 2, but the components are preferably returned to state 1 in which the keys and states are deleted and both authentication and association are required to reestablish unauthorized communications.

Figure 6:
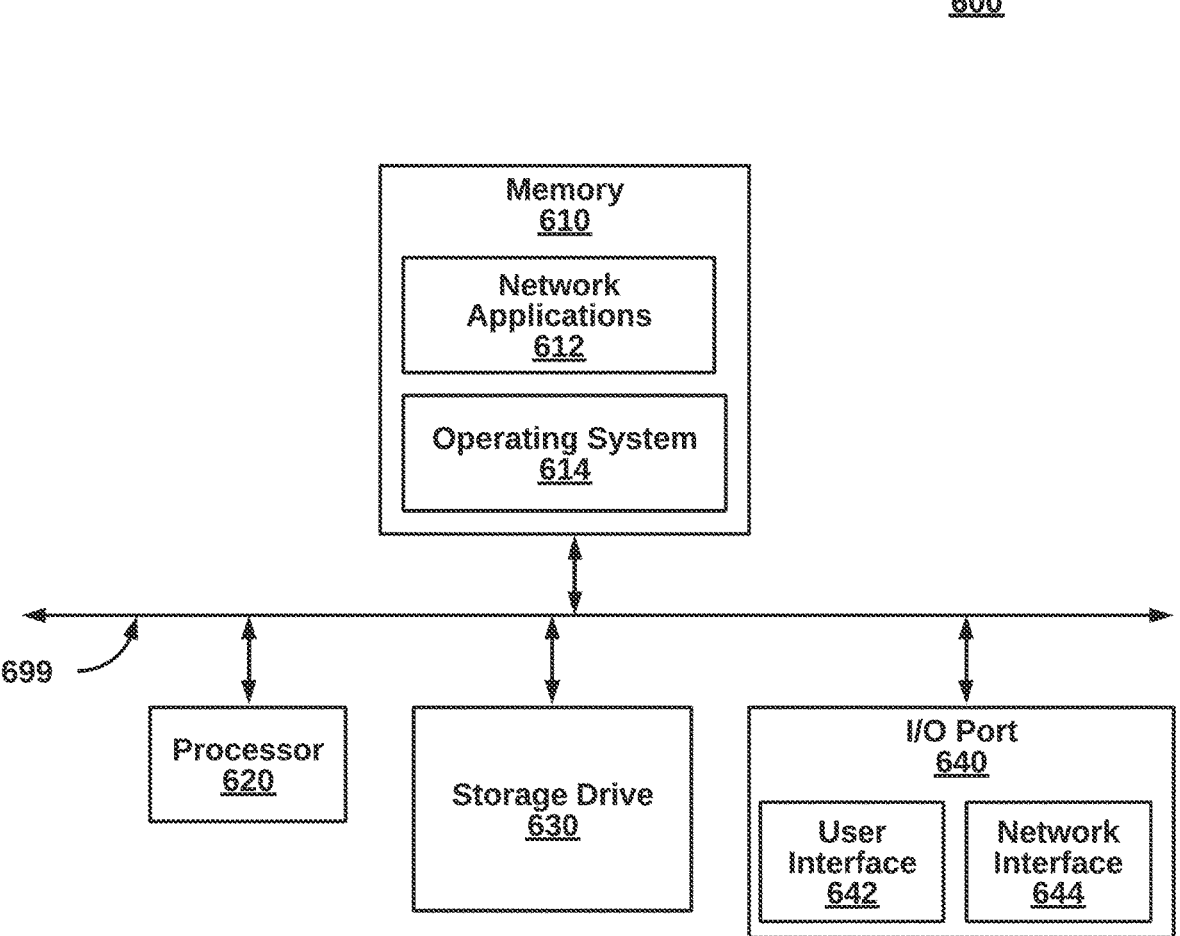
FIG. 6 is a block diagram illustrating an exemplary computing device, according to one embodiment.

The access points 120, 130 can be any of the computing devices, such as a personal computer, a server blade, any computing environment as shown in FIG. 6. The access points 120, 130 are preferably connected to the network (or to a switch, router, hub, or another access point that is connected to the network 199) via a wired or wireless connection. The access points 120, 130 can be set-up in various configurations with other access points to provide wireless coverage areas. In one embodiment, the functionality is incorporated into a switch or router, and in another embodiment, is incorporated into a custom enclosure. In operation, the access points 120, 130 transmit network packets to and from stations.

The Wi-Fi 6E wireless client 140 connects to access points detected by beacons broadcast periodically over a radio range. Proximity may be closer the legacy access point 130, having a stronger SSID, and thus the Wi-Fi 6E station 140 may be inclined to select the legacy access point 130 among several other options, for sending a probe request. The Wi-Fi controller 110 effectively overrides the client autonomy in access point selection by steering the Wi-Fi 6E station towards the Wi-Fi 6E access point 130. In some cases, local policies of the Wi-Fi 6E wireless client 140 or network security policies may override the upgrade opportunity and choose the lower band legacy channels. In other cases, a maximum number of wireless stations, channel interference, network traffic patterns, or other conditions dictate choosing to remain on legacy channels.

The Wi-Fi 6E station 140 can be, for example, a mobile station, STA, client or wireless device, a personal computer, laptop, tablet computer, smart phone, mobile computing device, Internet access applications, end station or any other computing device as described in FIG. 6. Wi-Fi 6E station 140 is wirelessly couples to access points using a radio and antenna. No pre-configuration or client is needed. The Wi-Fi 6E station 140 operates according to wireless standards such as IEEE 802.11a, b, g, n, ac, w or any other wireless standard. The Wi-Fi 6E wireless client 140 sends and/or receives network packets for access applications being executed.

FIG. 2 is a more detailed block diagram illustrating the Wi-Fi controller 110 of the system of FIG. 1, according to one embodiment. The Wi-Fi controller 110 includes an unauthorized probe request identification module 210, an access point selection module 220, an RNR information module 230, and a probe response module 240. The components can be implemented in hardware, software, or a combination of both.

The probe request identification module 210 receives from, a legacy access point, a probe request sent from a Wi-Fi 6E wireless client to the legacy access point. Because the Wi-Fi controller 110 can manage several access points, some overlapping in RF coverage range, more than one access point may report the same probe request. In an alternative embodiment, a Wi-Fi 6E access point reports when a probe request is transmitted to a legacy access point. The same Wi-Fi 6E access point may also be selected to serve the Wi-Fi 6E client from which the probe request is detected.

The access point selection module 220 selects a Wi-Fi 6E access point for connection from the plurality of access points, proximate to the Wi-Fi 6E wireless client. Various selection algorithms can be implemented. Selection factors can rely on SSI measurements, number of connected clients, network congestion, network policies, and the like. Multiple options can also be presented.

The RNR information module 230 collects RNR information about Wi-Fi 6E from one or more Wi-Fi 6E wireless access points. Requests for data can be transmitted to each access point, and responses can be collected for aggregation into a report (e.g., in a CSV format).

The probe response module 240 transmits the RNR information, to the legacy access point. In turn, the legacy access point forwards the RNR information to the Wi-Fi 6E wireless client as part of a probe response sent responsive to the probe request.

In some embodiments, the probe request identification module 220 detects a subsequent probe request sent from the Wi-Fi 6E wireless client to initiate association with the Wi-Fi 6E access point using the RNR information.

FIG. 3 is a block diagram illustrating a data frame 300 with RNR information, according to one embodiment. The data frame 300 is composed of a several data fields, including neighbor AP information fields 330 of variable octets, along with element ID field 310 and length filed 320, both being one octet. In turn, fields within the Neighbor AP Information Fields 330 include connectively parameters. Within the neighbor AP information fields 330 is a Target Beacon Transmission Time (TBTT) information filed type field 331, a filtered neighbor AP field 332, a reserved field 333, a TBTT information count field 334 and a TBTT information length field 335.

One embodiment of RNR information includes channel number, operating class, BSSID, short SSID, and BSS parameters. The channel number indicates a 6 GHz primary channel (e.g., channel 37). The operating class is an indication of the 6 GHz channel size. For example, an operating class of 134 indicates a channel size of 40 MHz while an operating class of 131 indicates a channel size of 20 MHz. Many other variations are possible.

II. Methods for Steering Wi-Fi 6E Wireless Clients (FIGS. 4-5)

Figure 4:
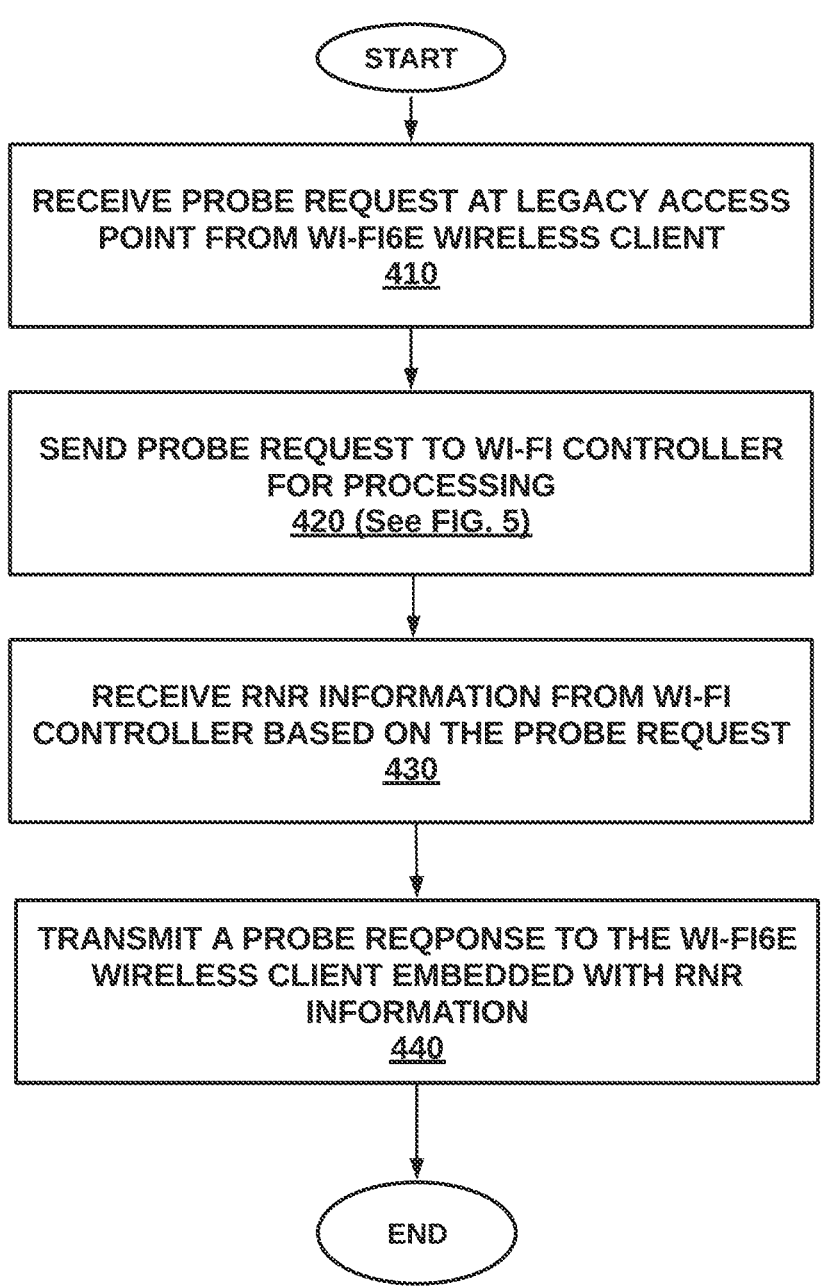
FIG. 4 is a high-level flow diagram illustrating a method for steering Wi-Fi 6E wireless clients to Wi-Fi 6E access points on hybrid wireless networks, according to one embodiment.

FIG. 4 is a high-level flow diagram illustrating a method 400 for steering Wi-Fi 6E wireless clients from a legacy access point to a Wi-Fi 6E access point, according to one embodiment. The method 400 can be implemented by, for example, an authorized access point (e.g., access point 120 of FIG. 1).

At step 410 a probe request is received by a legacy access point is detected to be from a Wi-Fi 6E wireless client. At step 420 the probe request is sent to a Wi-Fi controller for processing, as discussed more fully below. RNR information received back from the Wi-F controller, at step 430, is embedded into a probe response is sent to the Wi-Fi 6E client, at step 440.

Figure 5:
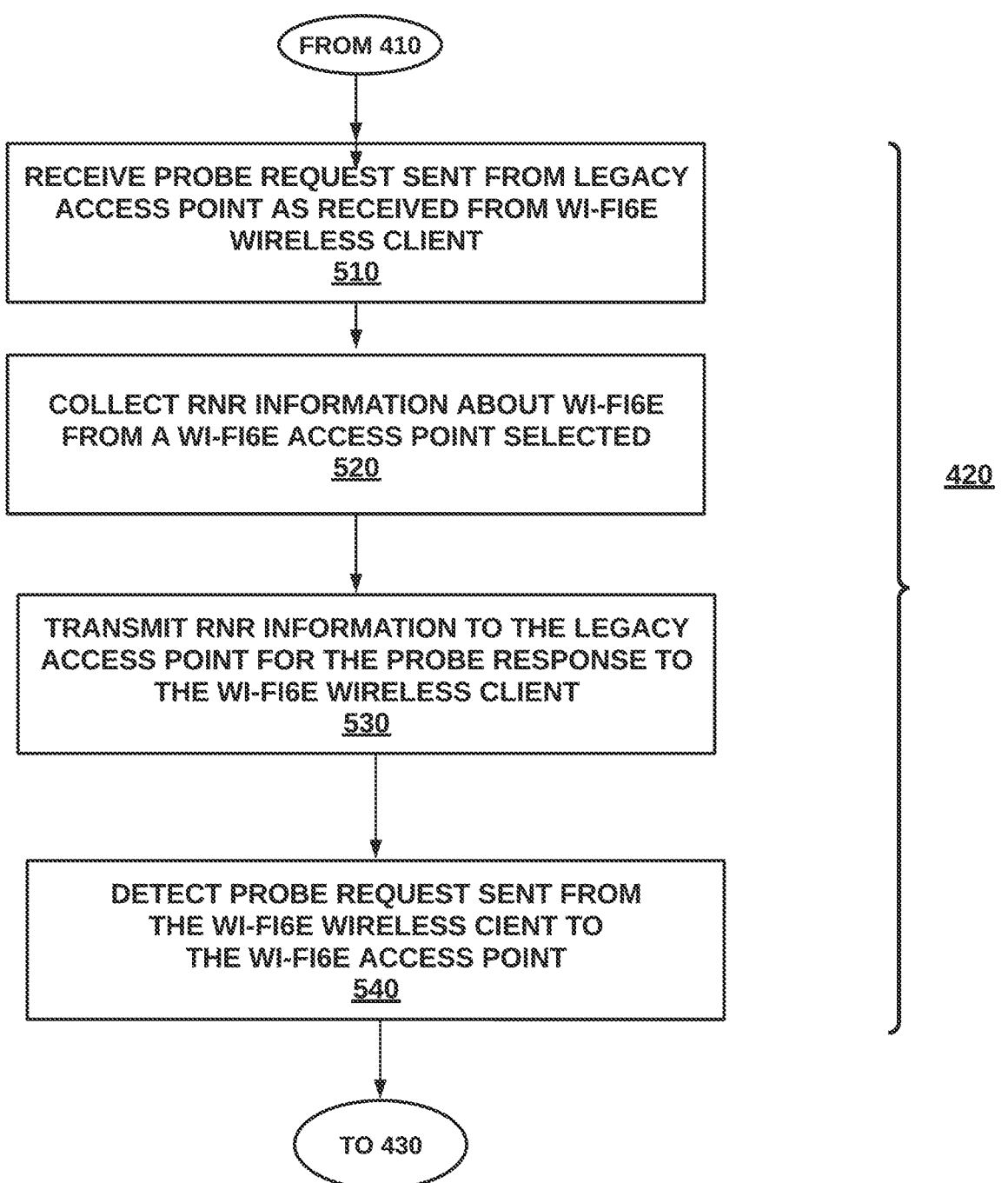
FIG. 5 is a high-level flow diagram illustrating a step for processing the probe request by the Wi-Fi controller, from the method of FIG. 4, according to one embodiment.

FIG. 5 is a more detailed flow diagram illustrating the step 420 for processing the probe request by the Wi-Fi controller, according to an embodiment.

At step 510, selecting a Wi-Fi 6E access point for connection from the plurality of access points, proximate to the Wi-Fi 6E wireless client. One embodiment selects multiple potential access points for client selection.

At step 520, RNR information about Wi-Fi 6E is collected from the Wi-Fi 6E wireless client. The specific data collected and data frame format are discussed above in association with FIG. 3.

At step 530, the RNR information is transmitted to the legacy access point. The legacy access point forwards the RNR information to the Wi-Fi 6E wireless client as part of a probe response sent responsive to the probe request. In some instances, the Wi-Fi controller generates the probe response in full and, in other instances, the legacy access point generates the probe response in full using the RNR information.

At step 540, a probe request is detected, sent from the Wi-Fi 6E wireless client to initiate association with the Wi-Fi 6E access point using the RNR information. This is an indication of successful steering. Historical information can be kept on steering outcomes for use in future steering operations. The history can be specific to a client or abstractly tracked for the network as a whole. For example, if a client never steers away from the legacy access point or if a client always steers away from the legacy access point, the outcomes can be used to govern future operations.

III. Generic Computing Device (FIG. 6)

FIG. 6 is a block diagram illustrating an exemplary computing device 600 for use in the system 100 of FIG. 1, according to one embodiment. The computing device 600 is an exemplary device that is implementable for each of the components of the system 100, including the Wi-Fi controller 110, the legacy access point 120, the Wi-Fi 6E access point 130 and the Wi-Fi 6E wireless client 140. Additionally, the computing device 600 is merely an example implementation itself, since the system 100 can also be fully or partially implemented with laptop computers, tablet computers, smart cell phones, Internet access applications, and the like.

The computing device 600, of the present embodiment, includes a memory 610, a processor 620, a hard drive 630, and an I/O port 640. Each of the components is coupled for electronic communication via a bus 650. Communication can be digital and/or analog, and use any suitable protocol.

The memory 610 further comprises network access applications 612 and an operating system 614. The network access applications 620 can include the modules of network access applications or access points as illustrated in FIGS. 2-4. Other network access applications can include 612 a web browser, a mobile access applications, an access applications that uses networking, a remote access applications executing locally, a network protocol access applications, a network management access applications, a network routing access applications, or the like.

The operating system 614 can be one of the Microsoft Windows® family of operating systems (e.g., Windows 98, 98, Me, Windows NT, Windows 2000, Windows XP, Windows XP x84 Edition, Windows Vista, Windows CE, Windows Mobile, Windows 7 or Windows 8), Linux, HP-UX, UNIX, Sun OS, Solaris, Mac OS X, Alpha OS, AIX, IRIX32, or IRIX84. Other operating systems may be used. Microsoft Windows is a trademark of Microsoft Corporation.

The processor 620 can be a network processor (e.g., optimized for IEEE 802.11), a general purpose processor, an access applications-specific integrated circuit (ASIC), a field programmable gate array (FPGA), a reduced instruction set controller (RISC) processor, an integrated circuit, or the like. Qualcomm Atheros, Broadcom Corporation, and Marvell Semiconductors manufacture processors that are optimized for IEEE 802.11 devices. The processor 620 can be single core, multiple core, or include more than one processing elements. The processor 620 can be disposed on silicon or any other suitable material. The processor 620 can receive and execute instructions and data stored in the memory 610 or the hard drive 630.

The storage device 630 can be any non-volatile type of storage such as a magnetic disc, EEPROM, Flash, or the like. The storage device 630 stores code and data for access applications.

The I/O port 640 further comprises a user interface 642 and a network interface 644. The user interface 642 can output to a display device and receive input from, for example, a keyboard. The network interface 644 connects to a medium such as Ethernet or Wi-Fi for data input and output. In one embodiment, the network interface 644 includes IEEE 802.11 antennae.

Many of the functionalities described herein can be implemented with computer software, computer hardware, or a combination.

Computer software products (e.g., non-transitory computer products storing source code) may be written in any of various suitable programming languages, such as C, C++, C#, Oracle® Java, JavaScript, PHP, Python, Perl, Ruby, AJAX, and Adobe® Flash®. The computer software product may be an independent access point with data input and data display modules. Alternatively, the computer software products may be classes that are instantiated as distributed objects. The computer software products may also be component software such as Java Beans (from Sun Microsystems) or Enterprise Java Beans (EJB from Sun Microsystems).

Furthermore, the computer that is running the previously mentioned computer software may be connected to a network and may interface to other computers using this network. The network may be on an intranet or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, and 802.ac, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical access applications. This description will enable others skilled in the art to best utilize and practice the invention in various embodiments and with various modifications as are suited to a particular use. The scope of the invention is defined by the following claims.

I claim:

1. A computer-implemented method in a Wi-Fi controller of a data communication network, communicatively coupled to manage a plurality of access points over a hybrid wireless network of Wi-Fi 6E access points and legacy access points without Wi-Fi 6E capability, for steering Wi-Fi 6E wireless clients to Wi-Fi 6E access points, the method comprising:

receiving from, a legacy access point, a probe request sent from a Wi-Fi 6E wireless client to the legacy access point;

selecting a Wi-Fi 6E access point for connection from the plurality of access points, proximate to the Wi-Fi 6E wireless client, wherein a signal strength of an SSID between the Wi-Fi 6E wireless client and the legacy access point is stronger than a signal strength of an SSID between the Wi-Fi 6E wireless client and the Wi-Fi 6E access point;

collecting Reduced Neighbor Report (RNR) information about Wi-Fi 6E from the Wi-Fi 6E wireless client;

transmitting the RNR information, to the legacy access point, wherein the legacy access point forwards the RNR information to the Wi-Fi 6E wireless client as part of a probe response sent responsive to the probe request; and detecting a subsequent probe request sent from the Wi-Fi 6E wireless client to initiate association with the Wi-Fi 6E access point using the RNR information.

2. The method of claim 1, wherein the Wi-Fi 6E wireless client determines an SSID from the RNR information matches a beacon received with an embedded SSID.

3. The method of claim 1, wherein the RNR information comprises a list of Wi-Fi 6E access points.

4. A non-transitory computer-readable medium storing instructions that, when executed by a processor, perform a computer-implemented method in a Wi-Fi controller of a data communication network and communicatively coupled to manage a plurality of access points over a hybrid wireless network of Wi-Fi 6E access points and legacy access points without Wi-Fi 6E capability, for steering Wi-Fi 6E wireless clients to Wi-Fi 6E access points, the method comprising:

receiving from, a legacy access point, a probe request sent from a Wi-Fi 6E wireless client to the legacy access point;

selecting a Wi-Fi 6E access point for connection from the plurality of access points, proximate to the Wi-Fi 6E wireless client, wherein a signal strength of an SSID between the Wi-Fi 6E wireless client and the Wi-Fi 6E access point is lower than a signal strength of an SSID between the Wi-Fi 6E wireless client and the legacy access point;

collecting Reduced Neighbor Report (RNR) information about Wi-Fi 6E from the Wi-Fi 6E wireless client;

transmitting the RNR information, to the legacy access point, wherein the legacy access point forwards the RNR information to the Wi-Fi 6E wireless client as part of a probe response sent responsive to the probe request; and detecting a subsequent probe request sent from the Wi-Fi 6E wireless client to initiate association with the Wi-Fi 6E access point using the RNR information.

5. A Wi-Fi controller of a data communication network and communicatively coupled to manage a plurality of access points over a hybrid wireless network of Wi-Fi 6E access points and legacy access points without Wi-Fi 6E capability, for steering Wi-Fi 6E wireless clients to Wi-Fi 6E access points, the Wi-Fi controller comprising:

a processor;

a network interface communicatively coupled to the processor and to the hybrid wireless network; and a memory, communicatively coupled to the processor and storing:

a probe request detection module to receive from, a legacy access point, a probe request sent from a Wi-Fi 6E wireless client to the legacy access point;

a Wi-Fi 6E access point selection module to select a Wi-Fi 6E access point for connection from the plurality of access points, proximate to the Wi-Fi 6E wireless client, wherein a signal strength of an SSID between the Wi-Fi 6E wireless client and the Wi-Fi 6E access point is lower than a signal strength of an SSID between the Wi-Fi 6E wireless client and the legacy access point;

an RNR information module to collect Reduced Neighbor Report (RNR) information about Wi-Fi 6E from the Wi-Fi 6E wireless client, and to transmit the RNR information, to the legacy access point, wherein the legacy access point forwards the RNR information to the Wi-Fi 6E wireless client as part of a probe response sent responsive to the probe request, wherein the probe request detection module detects a subsequent probe request sent from the Wi-Fi 6E wireless client to initiate association with the Wi-Fi 6E access point using the RNR information.

\* \* \* \* \*